Oct. 12, 1954 W. D. FORD 2,691,248
NODULATED CELLULAR GLASS AND METHOD OF FORMING
Filed Dec. 19, 1950
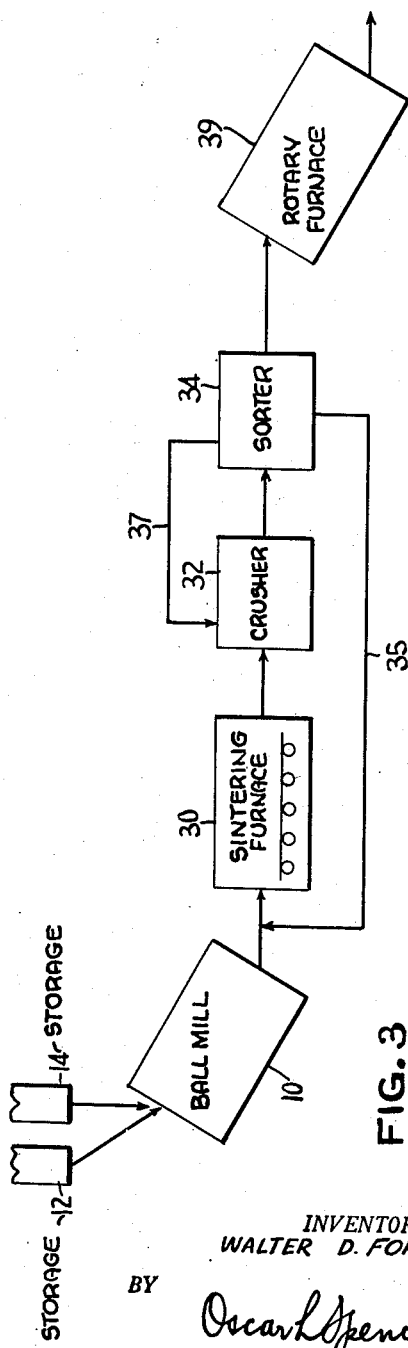
INVENTOR.
WALTER D. FORD
BY
Oscar L. Spencer
ATTORNEY Patented Oct. 12, 1954

2,691,248

UNITED STATES PATENT OFFICE 2,691,248

NODULATED CELLULAR GLASS AND METHOD OF FORMING

Walter D. Ford, Port Allegany, Pa., assignor to Pittsburgh Corning Corporation, Allegheny County, Pa., a corporation of Pennsylvania Application December 19, 1950, Serial No. 201,683

14 Claims. (Cl. 49—77)

This invention pertains to the manufacture of cellular glass bodies and has for its specific object the formation of small relatively spherical cellular glass bodies.

In the present invention, no molds are required and annealing and subsequent processing are eliminated. The product of the present invention is formed of closed cells and therefore is substantially impervious to moisture and vapors. It is also light in weight and, as hereinafter described, its density may be varied within limits so as to float on liquids of any given specific gravity.

For purposes of the present invention, the glass used may be conventional lime soda glass known as window glass, or a boro-silicate glass containing considerable proportions (5 to 15%) of boric oxide, or other suitable glass. Preferably, the glass will contain suitable amounts (.08 to 2.5%) of an oxygen-giving agent, such as $SO_3$. If not, ferric oxide or antimony trioxide (in amounts of 0.1 to 8%) may be added to the pulverized glass-carbon mixture. The glass is preferably pulverized together with about 0.1 to 2% by weight of carbonaceous materials to form a mixture, 95% of which will pass a screen of 200 mesh. The carbon may comprise lamp black, carbon black, coal, or coke in amounts of 0.1 to 5% of the mixture. Where carbon black is used, about 0.1 to 0.2% by weight of the mixture has been found most suitable. It is recommended that care be taken to secure a uniform mixture of the glass and carbon so that cellulation will be uniform. Due to the small size of the cellular glass product and the desirability of maintaining a relatively spherical shape, uniform cellulation is desirable to prevent distortion and even possible destruction of the pellets or nodules which may result when cellulation is uneven.

Where the intended use of the pellets is as aggregate for concrete, insulation, or other purposes where both lightness and mechanical strength are of prime importance, I propose to provide a product having a varying cross-sectional density. When the product is for purposes of a vapor lock or similar purposes and strength is not of prime importance, I propose to provide a product of substantially uniform cross-sectional density. In either case the product may be made in a variety of sizes and densities, preferably being within a density of 0.15 to 0.35 grams per cubic centimeter, however, products having a higher or lower density may be produced in accordance with the invention. In all cases I propose to provide an outer skin of glass on the pellets.

For a product possessing both lightness and mechanical strength, I provide pellets having a core of highly cellulated glass, an intermediate layer of less highly cellulated glass, and an outer enclosing skin layer of substantially uncellulated glass, it being understood that cellular glass resulting from the process herein described comprises relatively small closed cells of glass. Within the cells is a gas which, during cellulation, expands the very thin glass walls of the cells. After cellulation ceases and the pellets are cooled, the gas shrinks in volume, leaving the cell walls without internal support. Thus, highly cellulated glass is brittle and readily fractures under concentrated or "point" pressures. When, however, the amount of contained carbon is reduced, there are less cells and consequently the cell walls are thicker, thus possessing greater strength. In my process I take advantage of this characteristic of the product and, after providing a uniform mixture of glass and carbon, burn out portions of the carbon before the glass sinters. Hence, by control of the furnace atmosphere, its temperature, and the time during which the pellets are exposed to the oxidizing atmosphere, I can control not only the depth of the solid glass outer skin but also that of the intermediate layer of less cellulated glass. Furthermore, by controlling the temperature and time the pellet remains in the cellulation portion of the furnace, I can control the degree of cellulation in those portions of the product which retain their carbon.

For a better understanding of the invention, reference may be had to the accompanying drawing in which:

Fig. 1 is a flow plan illustrating one method of making the cellulated nodule of the present invention;

Fig. 2 is a view partially in section of a nodule of cellulated glass, and

Fig. 3 is a flow plan showing another method of making a cellulated nodule.

In the flow plan shown in Fig. 1, a batch suitable for making cellulated glass is ground in a ball mill 10 to a fine particle size. The constituents of the batch are glass cullet and a cellulating agent such as carbon which are fed to the ball mill from suitable storage means 12 and 14. After being ground to the proper particle size, the batch is removed from the ball mill and is formed into pellets.

The pellets or nodules may be formed in a conventional pellet or briquetting machine 16, or the mixture may be extruded and shaped to the desired size by use of suitable equipment well known in the ceramic industries.

The hereinbefore described dry mixture of glass and carbon black has a pronounced tendency to cohere when pressed into the desired form, but in cases where this natural tendency to cohere is insufficient, a suitable binder such as water, a small amount of dextrose in water, urea in water solution, a suspension of colloidal silica, or some other such binder may be used. Care must be exercised in the amount and nature of binder used so as to not modify the hereinafter described process. The size of the bodies will depend on the intended use, giving due regard to the increase of size resulting from cellulation. The hereinbefore described mixture of glass and carbon black, when cellulated, will increase from 6 to 10 times its original size.

The pellets or nodules, after forming, must be heated for sintering and cellulating. For purposes of sintering, the nodules are gradually heated to a temperature of 1400° to 1450° F. to insure softening and cohering of the glass particles, and are maintained at this temperature until the entire mass is thus sintered. This heating is done, at least in part, in an oxidizing atmosphere so that the carbon is burned out on the outer skin of the nodules, before sintering, leaving only the glass. The initial heating is preferably performed in the oxidizing atmosphere so that the surface carbon will ignite and burn out before sintering of the glass is effected. The depth and degree to which the carbon is thus removed may be controlled by the size of pellet, the firing temperature, the firing time, and the atmospheric condition of the furnace.

The nodules are then further heated to a temperature of 1600° to 1700° F. for cellulation. The soft glass outer skin on the nodules will expand from the pressure of the gas within but does not cellulate since the carbon has burned out, as hereinbefore described. After cellulation is completed, the pellets are cooled to room temperature and are ready for use without annealing or further processing.

The apparatus used to heat the nodules may be of several forms. Each will include a long tunnel-like furnace 18 having means for transportation of the nodules through the furnace and to maintain the required temperatures in the sintering and cellulating zones thereof. Preferably, a rotary type kiln is employed so that the nodules are rolled about during processing and retain a relatively spherical shape. A flat belt conveyor may be used, however, in which case the nodules tend to have flattened top and bottom surfaces.

The resultant product 20 may have a diameter of about $\frac{1}{16}$ to 4 inches. It has a cross section comprising an outer skin 22 of glass which is substantially impervious to moisture, an inner core 24 of cellulated glass composed of many closed glass cells filled with gas, and an intermediate layer 26 of less cells varying from the outer skin to the inner core. This intermediate layer 26 has a thickness of about $\frac{1}{16}$ to $\frac{1}{4}$ of an inch in pellets having a diameter of about 1 to 4 inches and the intermediate layer 26 has a relative density of about twice that of the inner core 24. The change in density between layer 26 and core 24 is usually gradual. The glass skin is sintered glass, that is, softened glass particles which are adhered to each other and have hardened. The pulverized glass is not heated to a sufficiently high temperature to run together and form solid glass. Therefore, this outer skin has a closed surface, but beneath the surface, sufficient air or gas is entrapped to result in a porous form. The core portion, having retained all its carbon, is highly cellular in construction. The density of this core portion may be varied through variation in the time the nodule was retained at the cellulating temperature. The depth or thickness of the outer skin and adjacent less relatively uncellulated material depends on the degree to which the carbon in the mixture was burned out of the nodule before the mass sintered.

A further embodiment of the invention is shown in the flow plan of Fig. 3. In this embodiment the glass cullet and cellulating agent are again ground in a ball mill 10 to provide a finely divided mixture. This mixture is then transferred to a sintering furnace 30 where the ground batch is heated, preferably in a reducing atmosphere, to a temperature sufficiently high to cause the particles of glass to soften and coalesce into a sintered mass. If this sintering is conducted in an oxidizing atmosphere, then the necessity of an oxidizing atmosphere in the subsequent heating for cellulation to produce a product of varying density is minimized.

The sintered mass is allowed to cool and is then crushed in a conventional crushing machine 32 to provide small sintered particles. After the sintered mass is crushed into small sintered particles, these small particles are passed through a sorting or screening machine 34 to obtain sintered particles of the size desired.

The particles which are too fine are returned (see line 35) to the sintering furnace to be sintered together again. The particles which are too large are returned (see line 37) to the crusher 32 to be recrushed. Sometimes it is desired to have a mixture of various sized sintered particles for cellulating. In such case the sintered particles are merely crushed and the screening or sorting step is omitted.

The sintered particles of desired particle size are next conveyed to a cellulating furnace 39 where they are heated to cellulating temperature. During the re-heating portion of the process, a rotary kiln is preferred since the particles will soften as they near the cellulation temperature, and the rolling movement within the kiln imparts a relatively spherical shape to them. In order to prevent the particles from adhering to each other during the re-heating, they may be coated with graphite or fine silica.

The product of this modification of the original process is a relatively spherical body of substantially uniform cellular cross-section. It also is enclosed in a very thin skin of glass. This thin skin results from the rotation of the kiln which causes the outer surface to form a solid as the outermost layer of gas cells breaks down and the softened glass coheres.

This latter product is of considerably less density than that resulting from the first mentioned process. Here again, the density may be varied by variation in the length of time the individual nodules are retained at cellulating temperature. The lightest density will be a result of retaining the pellets at cellulating temperature until all of the carbon has united with the $SO_3$ radical of the glass to produce $SO_2$ gas.

This application is a continuation-in-part of my copending application, Serial No. 25,872, filed May 8, 1948 and now abandoned.

What is claimed:

1. As an article of manufacture, a rounded substantially smooth cellulated nodule of glass comprising a core formed of a myriad of small, sealed, cohered bubbles of glass, a hard outer uncellulated skin of glass, and an intermediate layer of a density between that of the core and the skin, said article having an apparent density of .15 to .35 grams per cubic centimeter.

2. An article as defined in claim 1, in which the intermediate layer is of a relative density of about twice that of the core.

3. An article as defined in claim 1, in which the intermediate layer is of the thickness of about 1/16 to 1/4 of an inch, and being about twice as dense as the core.

4. An article as defined in claim 1, which is of a diameter of about 1/16 to 4 inches.

5. A method of forming rounded, substantially smooth, cellulated nodules of glass, which method comprises providing small masses of a mixture of pulverulent carbon and powdered glass containing a compound reactable with carbon to produce cellulating gases at a temperature above the sintering point of the glass, heating the small masses in an oxidizing atmosphere to a temperature sufficient to sinter the glass and oxidize substantially all the carbon adjacent the surface of the small masses, and then heating the cohered masses to a temperature sufficient to generate gases, by reason of reaction of the retained carbon with the compound to form cellulated masses.

6. A method as defined in claim 5, in which the sintering temperature is about 1400° to 1450° F. and the cellulating temperature is about 1600° to 1700° F.

7. A method as defined in claim 5, in which the pulverulent carbon comprises 0.1 to 2% of the mixture.

8. A method as defined in claim 5, in which the small masses of a mixture of powdered glass and pulverulent carbon are in the form of prepared pellets.

9. A method of forming rounded, substantially smooth, cellulated nodules of glass, which comprises providing a mass of pulverulent carbon and powered glass containing a compound reactable with carbon to produce cellulating gases at a temperature above the sintering point of the glass, heating the mass within a reducing atmosphere to a temperature sufficient to sinter the glass, cooling and crushing the sintered mass to provide particles of the desired size, then reheating the crushed particles in an oxidizing atmosphere to a temperature sufficient to oxidize substantially all the carbon adjacent to the surface of the crushed particles, heating the particles to a temperature sufficient to generate gases by reason of a reaction of the retained carbon with the compound to form cellulated particles, and cooling the cellulated particles.

10. A method as in claim 9, in which the heating of the particles is accomplished in a rotary furnace to cause the cells at the surface of each of the softened cellulating particles to be fractured and form a skin of uncellulated glass enclosing the particles.

11. A method as in claim 9, in which the particles after crushing are screened to segregate particles of uniform sizes and in which the heating of the particles to cellulate them is accomplished in a rotary furnace.

12. A method of forming rounded, substantially smooth, cellulated nodules of glass which comprises providing small masses of a pulverulent mixture comprising glass, carbon and a compound reactable with carbon to generate cellulating gases at a temperature above the sintering temperature of the glass, heating the masses in an oxidizing atmosphere to a temperature sufficient to sinter the glass and oxidize substantially all the carbon adjacent the surface of the small masses, and then heating the masses to a temperature sufficient to generate gases, by reason of reaction of the retained carbon with the compound, to form cellulated masses.

13. A method of forming rounded, substantially smooth, cellulated nodules of glass which comprises providing a pulverulent mixture comprising glass, carbon and a compound reactable with carbon to generate cellulating gases at a temperature above the sintering temperature of the glass, heating the mixture in a reducing atmosphere to a temperature sufficient to sinter the glass, cooling and crushing the sintered mass to provide particles of the desired size, reheating the crushed particles in an oxidizing atmosphere to a temperature sufficient to oxidize substantially all the carbon adjacent to the surfaces of the crushed particles, and then heating the particles to a temperature sufficient to generate gases, by reason of a reaction of the retained carbon with the compound, to form cellulated particles.

14. A method of forming rounded, substantially smooth, cellulated nodules of glass which comprises providing a small cohered mass of a pulverulent mixture comprising carbon and glass and containing a compound reactable with carbon to produce cellulating gases at a temperature above the sintering temperature of the glass, heating said mass in an oxidizing atmosphere to a temperature sufficient to oxidize substantially all of the carbon adjacent the surface of the mass and then heating the mass to a temperature sufficient to sinter the mass and to generate gases, by reason of reaction of the retained carbon with the contained compound, to form a cellulated mass.

References Cited in the file of this patent

UNITED STATES PATENTS

| Number | Name | Date |
|---|---|---|
| 1,741,574 | Kraus | Dec. 31, 1929 |
| 1,823,356 | Frink | Sept. 15, 1931 |
| 2,017,889 | Bowyer | Oct. 22, 1935 |
| 2,123,536 | Long | July 12, 1938 |
| 2,136,096 | Benner, et al. | Nov. 8, 1938 |
| 2,337,672 | Long | Dec. 28, 1943 |
| 2,533,633 | Schott | Dec. 12, 1950 |

FOREIGN PATENTS

| Number | Country | Date |
|---|---|---|
| 622,218 | Great Britain | Apr. 28, 1949 |
| 623,806 | Great Britain | May 24, 1949 |
| 623,807 | Great Britain | May 24, 1949 |